United States Patent
Haire

[19]

[11] Patent Number: 6,044,671

[45] Date of Patent: Apr. 4, 2000

[54] VEHICLE BRAKE LINE BLEEDING AID

[76] Inventor: David L. Haire, 421 Cedar Creek, Whitelake, Mich. 48383

[21] Appl. No.: 09/222,145

[22] Filed: Dec. 29, 1998

[51] Int. Cl.[7] .................................................. F16H 57/00
[52] U.S. Cl. ............................................. 70/202; 237/199
[58] Field of Search ............................. 70/198–203, 237, 70/238

[56] References Cited

U.S. PATENT DOCUMENTS

| | | | |
|---|---|---|---|
| 1,531,062 | 3/1925 | Barravecchia | 70/202 |
| 1,547,430 | 7/1925 | McDonald | 70/202 |
| 2,812,669 | 11/1957 | Reff | 70/202 |
| 3,719,063 | 3/1973 | Fouces et al. | 70/202 |
| 3,889,499 | 6/1975 | Cramer | 70/202 |
| 4,333,326 | 6/1982 | Winters | 70/203 |
| 4,615,192 | 10/1986 | Brown | 70/181 |
| 4,825,671 | 5/1989 | Wu | 70/202 X |
| 4,995,250 | 2/1991 | Chiou | 70/202 X |
| 5,267,458 | 12/1993 | Heh | 70/202 X |
| 5,282,373 | 2/1994 | Riccitelli | 70/202 X |
| 5,345,796 | 9/1994 | Chieh et al. | 70/202 |
| 5,379,619 | 1/1995 | Young | 70/202 |
| 5,535,605 | 7/1996 | Werner | 70/202 X |
| 5,537,846 | 7/1996 | Simon | 70/202 |
| 5,653,133 | 8/1997 | Passantino | 70/238 |
| 5,704,233 | 1/1998 | Farshad | 70/238 |
| 5,715,710 | 2/1998 | DeLucia et al. | 70/202 |
| 5,870,912 | 2/1999 | Vito | 70/237 X |
| 5,881,587 | 3/1999 | Vito | 70/237 X |
| 5,906,121 | 5/1999 | Mankarious | 70/199 |
| 5,911,765 | 6/1999 | DaSilva | 70/199 X |

FOREIGN PATENT DOCUMENTS

| | | | |
|---|---|---|---|
| 404709 | 12/1990 | European Pat. Off. | 70/202 |
| 608220 | 7/1926 | France | 70/202 |
| 2681823 | 4/1993 | France | 70/202 |
| 600913 | 12/1959 | Italy | 70/202 |
| 2043005 | 10/1980 | United Kingdom | 70/202 |
| 2255060 | 10/1992 | United Kingdom | 70/202 |

*Primary Examiner*—Suzanne Dino Barrett
*Attorney, Agent, or Firm*—Joseph N. Breaux

[57] ABSTRACT

A vehicle maintenance aid in the form of a vehicle brake line bleeding aid that is securable between a vehicle brake pedal and a fixed structure within the vehicle and which applies pressure to the brake pedal sufficient to force the brake pedal down when the brake line bleeding valves are opened. The vehicle brake line bleeding aid includes a brake pedal attachment assembly, a carpet gripping assembly, and a lockable pedal compress assembly pivotally connected at a first compression assembly end to the brake pedal attachment assembly and pivotally connected at a second compression assembly end to the carpet gripping assembly.

2 Claims, 2 Drawing Sheets

VEHICLE BRAKE LINE BLEEDING AID

TECHNICAL FIELD

The present invention relates to vehicle maintenance aids and more particularly to a vehicle brake line bleeding aid that is securable between a vehicle brake pedal and a fixed structure and which applies pressure to force the brake pedal downward when the brake line bleeding valves are opened reducing the number of men required to bleed the vehicle brake lines; the vehicle brake line bleeding aid including a brake pedal attachment assembly, a carpet gripping assembly, and a lockable pedal compress assembly pivotally connected at a first compression assembly end to the brake pedal attachment assembly and pivotally connected at a second compression assembly end to the carpet gripping assembly; the brake pedal attachment assembly including a front brake pedal contact plate assembly and a brake pedal gripping structure slidably mounted along a top edge of the contact plate of the front brake pedal contact plate of the front brake pedal contact plate assembly and lockable in a fixed position with a pair of locking screws each positioned through one of two elongated slots provided through the brake pedal gripping structure, the front brake pedal contact plate including a pivot plate extending outwardly from a back surface thereof and that is sized to fit between a first U-shaped connecting structure provided at the first compression assembly end and is connected with a first pivot pin to the first U-shaped connecting structure through two concentrically aligned apertures provided therethrough; the carpet gripping assembly including a planar base structure having a bottom surface having a plurality of carpet engaging structures extending outwardly therefrom and an upper surface having a compression end attachment plate extending upwardly therefrom that is sized to fit between a second U-shaped connecting structure provided at the second compression assembly end, the second U-shaped connecting structure having two concentrically aligned apertures through which a second pivot pin is inserted form the pivotal connection between the compression end attachment plate and the second U-shaped connecting structure; the lockable pedal compression assembly including the first and second U-shaped connecting structures, a tubular spring housing including an elongated spring rod travel slot formed through the sidewall of the tubular spring housing, an elongated spring rod, a spring rod travel limit pin extending radially outward from the elongated spring rod and slidably positioned within the elongated spring rod travel slot formed through the sidewall of the tubular spring housing, a spring rod locking screw threaded through an aperture formed through the tubular spring housing and screwable into a first position in locking engagement with the elongated spring rod and screwable into a second position out of locking engagement with the elongated spring rod, the tubular spring housing having installed therein first and second washer shaped spring rod travel guide/stops, the center of the elongated spring rod being slidably positioned through the holes of the first and second washer shaped guide/stops, a bottom portion of the elongated spring rod being inserted through the compression spring and into connection with the second U-shaped connecting structure.

BACKGROUND ART

Breeding vehicle brake lines typically requires two men: one to open the brake line bleed valves, and another to pump the brake pedal to pump the brake fluid out of the brake lines through the bleed valves. It would be a benefit, therefore, to have a vehicle brake line bleeding system that was securable between a vehicle brake pedal and a fixed structure within the vehicle and which applied pressure to force the brake pedal downward when the brake line bleeding valves or valve were opened, thereby reducing the number of men required to bleed the vehicle brake lines.

GENERAL SUMMARY DISCUSSION OF INVENTION

It is thus an object of the invention to provide a vehicle brake line bleeding aid that is securable between a vehicle brake pedal and a fixed structure and which applies pressure to force the brake pedal downward when the brake line bleeding valves are opened reducing the number of men required to bleed the vehicle brake lines.

It is a further object of the invention to provide a vehicle brake line bleeding aid that includes that includes a brake pedal attachment assembly, a carpet gripping assembly, and a lockable pedal compress assembly pivotally connected at a first compression assembly end to the brake pedal attachment assembly and pivotally connected at a second compression assembly end to the carpet gripping assembly; the brake pedal attachment assembly including a front brake pedal contact plate assembly and a brake pedal gripping structure slidably mounted along a top edge of the contact plate of the front brake pedal contact plate of the front brake pedal contact plate assembly and lockable in a fixed position with a pair of locking screws each positioned through one of two elongated slots provided through the brake pedal gripping structure, the front brake pedal contact plate including a pivot plate extending outwardly from a back surface thereof and that is sized to fit between a first U-shaped connecting structure provided at the first compression assembly end and is connected with a first pivot pin to the first U-shaped connecting structure through two concentrically aligned apertures provided therethrough; the carpet gripping assembly including a planar base structure having a bottom surface having a plurality of carpet engaging structures extending outwardly therefrom and an upper surface having a compression end attachment plate extending upwardly therefrom that is sized to fit between a second U-shaped connecting structure provided at the second compression assembly end, the second U-shaped connecting structure having two concentrically aligned apertures through which a second pivot pin is inserted form the pivotal connection between the compression end attachment plate and the second U-shaped connecting structure; the lockable pedal compression assembly including the first and second U-shaped connecting structures, a tubular spring housing including an elongated spring rod travel slot formed through the sidewall of the tubular spring housing, an elongated spring rod, a spring rod travel limit pin extending radially outward from the elongated spring rod and slidably positioned within the elongated spring rod travel slot formed through the sidewall of the tubular spring housing, a spring rod locking screw threaded through an aperture formed through the tubular spring housing and screwable into a first position in locking engagement with the elongated spring rod and screwable into a second position out of locking engagement with the elongated spring rod, the tubular spring housing having installed therein first and second washer shaped spring rod travel guide/stops, the center of the elongated spring rod being slidably positioned through the holes of the first and second washer shaped guide/stops, a bottom portion of the elongated spring rod being inserted through the compression spring and into connection with the second U-shaped connecting structure.

It is a still further object of the invention to provide a vehicle brake line bleeding aid that accomplishes all or some of the above objects in combination.

Accordingly, a vehicle brake line bleeding aid is provided. The vehicle brake line bleeding aid includes a brake pedal attachment assembly, a carpet gripping assembly, and a lockable pedal compress assembly pivotally connected at a first compression assembly end to the brake pedal attachment assembly and pivotally connected at a second compression assembly end to the carpet gripping assembly; the brake pedal attachment assembly including a front brake pedal contact plate assembly and a brake pedal gripping structure slidably mounted along a top edge of the contact plate of the front brake pedal contact plate of the front brake pedal contact plate assembly and lockable in a fixed position with a pair of locking screws each positioned through one of two elongated slots provided through the brake pedal gripping structure, the front brake pedal contact plate including a pivot plate extending outwardly from a back surface thereof and that is sized to fit between a first U-shaped connecting structure provided at the first compression assembly end and is connected with a first pivot pin to the first U-shaped connecting structure through two concentrically aligned apertures provided therethrough; the carpet gripping assembly including a planar base structure having a bottom surface having a plurality of carpet engaging structures extending outwardly therefrom and an upper surface having a compression end attachment plate extending upwardly therefrom that is sized to fit between a second U-shaped connecting structure provided at the second compression assembly end, the second U-shaped connecting structure having two concentrically aligned apertures through which a second pivot pin is inserted form the pivotal connection between the compression end attachment plate and the second U-shaped connecting structure; the lockable pedal compression assembly including the first and second U-shaped connecting structures, a tubular spring housing including an elongated spring rod travel slot formed through the sidewall of the tubular spring housing, an elongated spring rod, a spring rod travel limit pin extending radially outward from the elongated spring rod and slidably positioned within the elongated spring rod travel slot formed through the sidewall of the tubular spring housing, a spring rod locking screw threaded through an aperture formed through the tubular spring housing and screwable into a first position in locking engagement with the elongated spring rod and screwable into a second position out of locking engagement with the elongated spring rod, the tubular spring housing having installed therein first and second washer shaped spring rod travel guide/stops, the center of the elongated spring rod being slidably positioned through the holes of the first and second washer shaped guide/stops, a bottom portion of the elongated spring rod being inserted through the compression spring and into connection with the second U-shaped connecting structure.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
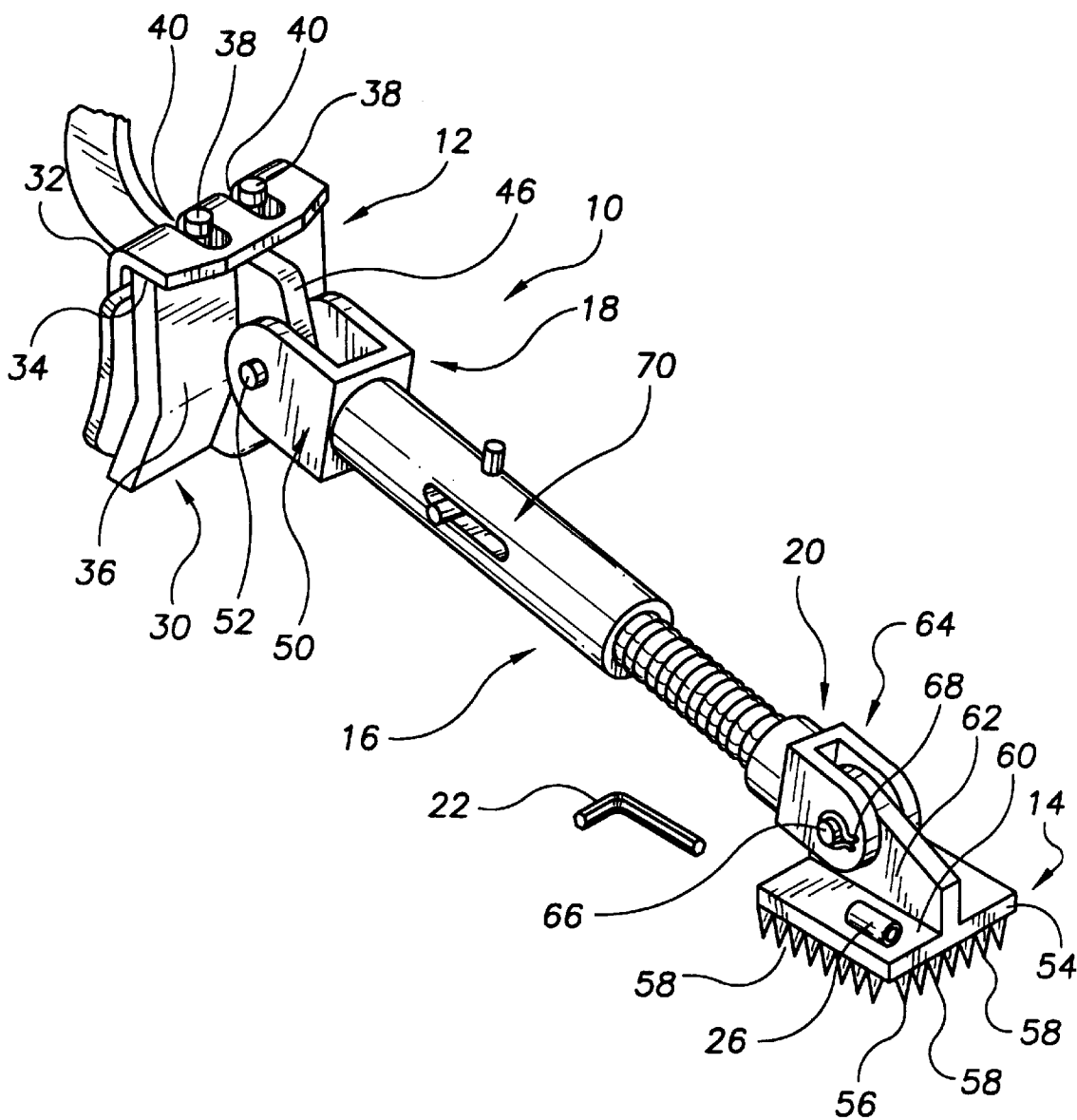
FIG. 1 is a perspective view of an exemplary embodiment of the vehicle brake line bleeding aid of the present invention showing the brake pedal attachment assembly, the carpet gripping assembly, the lockable pedal compress assembly pivotally connected at a first compression assembly end to the brake pedal attachment assembly and pivotally connected at a second compression assembly end to the carpet gripping assembly, and an optional hex wrench used for adjusting hex socket head locking screws of the vehicle brake bleeding aid and storable in connection with a wrench storage structure optionally provided on the carpet gripping assembly; the brake pedal attachment assembly including a front brake pedal contact plate assembly and a brake pedal gripping structure slidably mounted along a top edge of the contact plate of the front brake pedal contact plate and lockable in a fixed position with a pair of hex socket head locking screws each positioned through one of two elongated slots provided through the brake pedal gripping structure, the front brake pedal contact plate assembly including a pivot plate extending outwardly from a back surface thereof and that is sized to fit between a first U-shaped connecting structure and is connected with a first pivot pin to a first U-shaped connecting structure having two concentrically aligned apertures and provided at the first compression assembly end; the carpet gripping assembly including a planar base structure having bottom surface having a plurality of carpet engaging structures extending outwardly therefrom and an upper surface having a compression end attachment plate extending upwardly therefrom that is sized to fit between a second U-shaped connecting structure having two concentrically aligned apertures and provided at the second compression assembly end.
Figure 4:
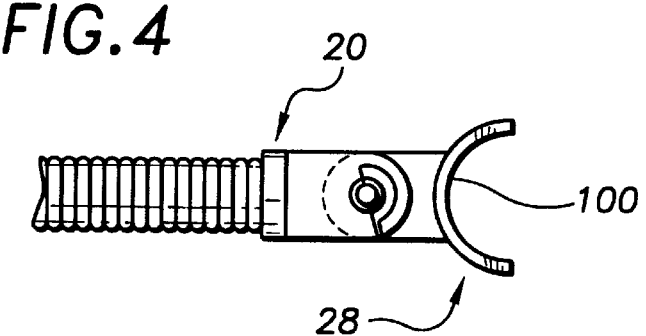
FIG. 4 is a detail perspective view showing a steering wheel gripping assembly attached to the second U-shaped connecting structure in place of the carpet gripping assembly, the steering wheel gripping assembly having a C-shaped channel for receiving a section of a steering wheel.

FIG. 1 is a perspective view showing an exemplary embodiment of the vehicle brake line bleeding aid of the present invention generally designated 10. Brake line bleeding aid 10 includes a brake pedal attachment assembly, generally designated 12; a carpet gripping assembly, generally designated 14; a lockable pedal compress assembly, generally designated 16, that is pivotally connected at a first compression assembly end, generally designated 18, to brake pedal attachment assembly 12 and pivotally connected at a second compression assembly end, generally designated 20, to carpet gripping assembly 14; an optional hex wrench 22; an optional tube shaped hex wrench storage structure 26 provided on carpet gripping assembly 14; and an optional steering wheel gripping assembly, generally designated 28 (FIG. 4).

Brake pedal attachment assembly 12 includes a front brake pedal contact plate assembly, generally designated 30, and a brake pedal gripping structure 32 slidably mounted along a top edge 34 of a contact plate 36 of front brake pedal contact plate assembly 30 and lockable in a fixed position with two hex socket headed locking screws 38, each positioned through one of two elongated slots 40 (see also FIG. 2) provided through the brake pedal gripping structure 32. Front brake pedal contact plate 36 includes a pivot plate 46 extending outwardly from a back surface thereof that is sized to fit between the spaced members of a first U-shaped connecting structure, generally designated 50, provided at first compression assembly end 18 and is pivotally connected thereto with a first pivot pin 52.

Carpet gripping assembly 14 includes a planar base structure, generally designated 54, having a bottom surface 56 provided with a plurality of carpet engaging structures 58 extending outwardly therefrom and an upper surface 60 having a compression end attachment plate 62 extending upwardly therefrom that is sized to fit between the spaced members of a second U-shaped connecting structure, generally designated 64, provided at second compression assembly end 18. Compression end attachment plate 62 is detachably pivotally connected between the spaced members of second U-shaped connecting structure 64 with a pivot pin 66 and a removable cotter pin 68.

Figure 2:
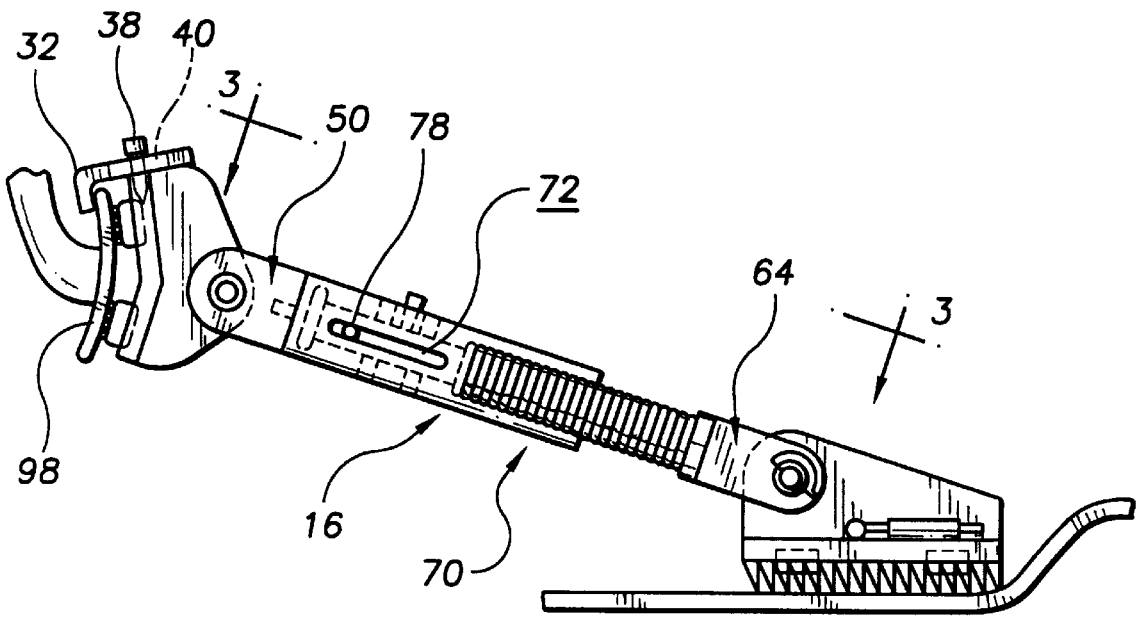
FIG. 2 is a side plan view of the vehicle brake line bleeding aid of FIG. 1 showing the optional hex wrench attached to the wrench holding structure provided on the top surface of the planar base structure of the carpet gripping assembly; the front brake pedal contact plate assembly including the L-shaped brake pedal gripping structure slidably mounted along the top edge of the contact plate of the front brake pedal contact plate and locked in a fixed position gripping a representative brake pedal with the hex socket head locking screws; and the lockable pedal compression assembly including the first and second U-shaped connecting structures, the tubular spring housing including the elongated spring rod travel slot, the spring rod, the hex socket headed spring rod locking screw and the compression spring in the compressed configuration.
Figure 3:
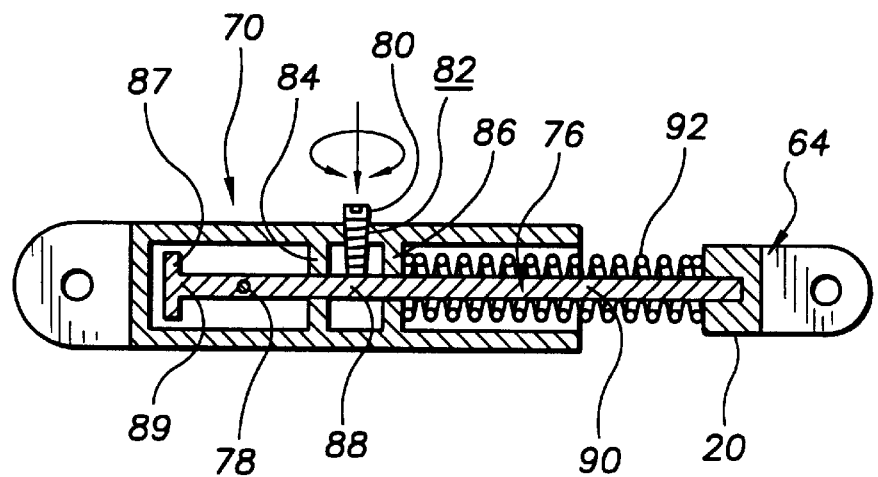
FIG. 3 is a cross sectional view of the lockable pedal compression assembly of FIG. 2 along the line 3—3 the tubular spring housing including the first and second spring rod travel guide/stop, the elongated spring rod with the flattened upper head end, the center positioned through the first and second spring rod travel guide/stop, and the bottom portion elongated spring rod being inserted through the compression spring and into connection with the second U-shaped connecting structure, the compression spring being compressed between the second U-shaped connecting structure and the second spring rod travel guide/stop, the elongated spring rod being lockable in a retracted position holding the compression spring in the compressed configuration by tightening the hex socket headed spring rod locking screw and releasable by loosening the hex socket headed spring rod locking screw.

Referring to FIG. 2, lockable pedal compression assembly 16 includes first and second U-shaped connecting structures 50,64; a tubular spring housing, generally designated 70 (see also FIG. 1) that includes an elongated spring rod travel slot 72 formed through the sidewall of tubular spring housing; referring now to FIG. 3, an elongated spring rod, generally designated 76; a spring rod travel limit pin 78 (see also FIG. 2) extending radially outward from elongated spring rod 76 and slidably entrapped within elongated spring rod travel slot 72 (FIG. 2) formed through the sidewall of tubular spring housing 70, a hex socket headed spring rod locking screw 80 threaded through threaded aperture 82 formed through tubular spring housing 70 and screwable into a first position in locking engagement with elongated spring rod 76 and screwable into a second position out of locking engagement with elongated spring rod 76. Tubular spring housing 70 has first and second washer shaped spring rod travel guide/stops 84,86 installed therein. A center portion 88 of elongated spring rod 76 is slidably positioned through the holes of first and second washer shaped guide/stops 84 and 86. A bottom portion 90 of elongated spring rod 76 is inserted through a compression spring 92 and into rigid connection with second compression assembly end 20 that in turn is rigidly attached to U-shaped connecting structure 64. A flattened upper head end 87 is provided at a top end 89 of elongated spring rod 76 to prevent elongated spring rod from being pulled through first washer shaped spring rod travel guide/stops 84 when compression spring 92 is fully extended.

With general reference to FIGS. 1,2 and 3, vehicle brake line bleeding aid 10 is used by loosening hex socket headed spring rod locking screw 80 to allow elongated spring rod 76 to slide into tubular steel housing 70. Compressing compression spring 90 by grabbing tubular steel housing and pushing down with carpet gripping assembly against a resistance structure until compression spring 90 is fully compressed. Elongated spring rod 76 is then locked in place holding compression spring 90 compressed between second compression assembly end 20 and second washer shaped guide/stop 86 by tightening hex socket headed spring rod locking screw 80 with hex wrench 22 into a first position in locking engagement with elongated spring rod 76. Brake pedal attachment assembly 12 is then attached to the vehicle break pedal 98 (FIG. 3) by positioning of front brake pedal contact plate assembly 30 and brake pedal gripping structure 32 as previously described and then locking brake pedal gripping structure 32 with hex socket headed locking screws 38 using hex wrench 22. The carpet engaging structures 58 extending from bottom surface 56 of carpet gripping assembly 14 are then forced into the vehicle carpet and hex socket headed spring rod locking screw 80 loosened with hex wrench 22 to unlock elongated spring rod 76 allowing spring force from compressed compression spring 90 to generate a force pushing downward on brake pedal 98. When a brake line bleeder valve is opened, hydraulic pressure drops and brake pedal 98 is force into the down most position. It make take several repetitions of this process to fully bleed the vehicle brake lines.

Should the use of carpet gripping assembly 14 not be possible or desirable, referring now also to FIG. 4, a user can replace carpet gripping assembly 14 with optional steering wheel gripping assembly 28 by removing cotter pin 68 and then withdrawing second pivot pin 66. Installing steering wheel gripping assembly 28 accomplished in the reverse manner. Steering wheel gripping assembly 28 includes a C-shaped channel 100 for receiving a section of a steering wheel.

It can be seen from the preceding description that a vehicle brake line bleeding aid has been provided that is securable between a vehicle brake pedal and a fixed structure and which applies pressure to force the brake pedal downward when the brake line bleeding valves are opened reducing the number of men required to bleed the vehicle brake lines; and that includes a brake pedal attachment assembly, a carpet gripping assembly, and a lockable pedal compress assembly pivotally connected at a first compression assembly end to the brake pedal attachment assembly and pivotally connected at a second compression assembly end to the carpet gripping assembly; the brake pedal attachment assembly including a front brake pedal contact plate assembly and a brake pedal gripping structure slidably mounted along a top edge of the contact plate of the front brake pedal contact plate of the front brake pedal contact plate assembly and lockable in a fixed position with a pair of locking screws each positioned through one of two elongated slots provided through the brake pedal gripping structure, the front brake pedal contact plate including a pivot plate extending outwardly from a back surface thereof and that is sized to fit between a first U-shaped connecting structure provided at the first compression assembly end and is connected with a first pivot pin to the first U-shaped connecting structure through two concentrically aligned apertures provided therethrough; the carpet gripping assembly including a planar base structure having a bottom surface having a plurality of carpet engaging structures extending outwardly therefrom and an upper surface having a compression end attachment plate extending upwardly therefrom that is sized to fit between a second U-shaped connecting structure provided at the second compression assembly end, the second U-shaped connecting structure having two concentrically aligned apertures through which a second pivot pin is inserted from the pivotal connection between the compression end attachment plate and the second U-shaped connecting structure; the lockable pedal compression assembly including the first and second U-shaped connecting structures, a tubular spring housing including an elongated spring rod travel slot formed through the sidewall of the tubular spring housing, an elongated spring rod, a spring rod travel limit pin extending radially outward from the elongated spring rod and slidably positioned within the elongated spring rod travel slot formed through the sidewall of the tubular spring housing, a spring rod locking screw threaded through an aperture formed through the tubular spring housing and screwable into a first position in locking engagement with the elongated spring rod and screwable into a second position out of locking engagement with the elongated spring rod, the tubular spring housing having installed therein first and second washer shaped spring rod travel guide/stops, the center of the elongated spring rod being slidably positioned through the holes of the first and second washer shaped guide/stops, a bottom portion of the elongated spring rod being inserted through the compression spring and into connection with the second U-shaped connecting structure.

It is noted that the embodiment of the vehicle brake line bleeding aid described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A vehicle brake line bleeding aid that is securable between a vehicle brake pedal and a fixed structure and which applies pressure to the brake pedal when the brake line bleeding valves are opened reducing the number of men required to bleed the vehicle brake lines, said vehicle brake line bleeding aid comprising:

a brake pedal attachment assembly;

a carpet gripping assembly; and a lockable pedal compress assembly pivotally connected at a first compression assembly end to said brake pedal attachment assembly and pivotally connected at a second compression assembly end to said carpet gripping assembly;

said brake pedal attachment assembly including a front brake pedal contact plate assembly and a brake pedal gripping structure slidably mounted along a top edge of a contact plate of said front brake pedal contact plate of said front brake pedal contact plate assembly and lockable in a fixed position with a pair of locking screws each positioned through one of two elongated slots provided through said brake pedal gripping structure, said front brake pedal contact plate including a pivot plate extending outwardly from a back surface thereof and that is sized to fit between a first U-shaped connecting structure provided at said first compression assembly end and is connected with a first pivot pin to said first U-shaped connecting structure through two concentrically aligned apertures provided therethrough;

said carpet gripping assembly including a planar base structure having a bottom surface having a plurality of carpet engaging structures extending outwardly therefrom and an upper surface having a compression end attachment plate extending upwardly therefrom that is sized to fit between a second U-shaped connecting structure provided at said second compression assembly end, said second U-shaped connecting structure having two concentrically aligned apertures through which a second pivot pin is inserted form said pivotal connection between said compression end attachment plate and said second U-shaped connecting structure;

said lockable pedal compression assembly including said first and second U-shaped connecting structures, a tubular spring housing including an elongated spring rod travel slot formed through a sidewall of said tubular spring housing, an elongated spring rod, a spring rod travel limit pin extending radially outward from said elongated spring rod and slidably positioned within said elongated spring rod travel slot formed through said sidewall of said tubular spring housing, a spring rod locking screw threaded through an aperture formed through said tubular spring housing and screwable into a first position in locking engagement with said elongated spring rod and screwable into a second position out of locking engagement with said elongated spring rod, said tubular spring housing having installed therein first and second washer shaped spring rod travel guide/stops, a center of said elongated spring rod being slidably positioned through holes of said first and second washer shaped guide/stops, a bottom portion of said elongated spring rod being inserted through said compression spring and into connection with said second U-shaped connecting structure.

2. The vehicle brake line bleeding aid of claim 1 wherein:

said carpet gripping assembly is detachably connected to said second U-shaped connecting structure; and said vehicle brake line bleeding aid further comprises:

steering wheel gripping assembly having a C-shaped channel for receiving a section of a steering wheel that is attached to the second U-shaped connecting structure with said second pivot pin.

* * * * *